US010976546B2

(12) United States Patent
Nagano et al.

(10) Patent No.: US 10,976,546 B2
(45) Date of Patent: Apr. 13, 2021

(54) HEAD-UP DISPLAY APPARATUS HAVING A FUNCTIONAL FILM WITH A CONTROLLABLE TRANSMITTANCE

(71) Applicant: Maxell, Ltd., Kyoto (JP)

(72) Inventors: Yuki Nagano, Oyamazaki (JP); Nozomu Shimoda, Oyamazaki (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/341,078

(22) PCT Filed: Dec. 18, 2017

(86) PCT No.: PCT/JP2017/045269
§ 371 (c)(1),
(2) Date: Apr. 11, 2019

(87) PCT Pub. No.: WO2018/117012
PCT Pub. Date: Jun. 28, 2018

(65) Prior Publication Data
US 2019/0235240 A1    Aug. 1, 2019

(30) Foreign Application Priority Data

Dec. 19, 2016  (JP) .............................. JP2016-245465

(51) Int. Cl.
*G09G 5/00*    (2006.01)
*G02B 27/01*   (2006.01)
(Continued)

(52) U.S. Cl.
CPC .......... *G02B 27/0101* (2013.01); *B60K 35/00* (2013.01); *G02B 26/02* (2013.01);
(Continued)

(58) Field of Classification Search
CPC .......... G09G 5/00; G09G 5/377; G09G 5/026; G09G 3/002; G02B 27/0101; G02B 26/02; G02F 1/13; B60K 35/00
See application file for complete search history.

(56) References Cited

U.S. PATENT DOCUMENTS

2007/0103747 A1*  5/2007  Powell ................... G02B 13/22
                                                        359/13
2008/0238814 A1* 10/2008  Ishikawa ............ G02B 27/0101
                                                        345/7
(Continued)

FOREIGN PATENT DOCUMENTS

JP       06-144083 A    5/1994
JP    2009-184406 A    8/2009
(Continued)

OTHER PUBLICATIONS

International Search Report of PCT/JP2017/045269 dated Feb. 27, 2018.

*Primary Examiner* — Adam J Snyder
(74) *Attorney, Agent, or Firm* — Mattingly & Malur, PC

(57) ABSTRACT

The present invention provides a head-up display apparatus capable of both long-distance display and short-distance display. A functional film 51 is mounted on a glare trap part 50 of a head-up display apparatus 1. In order to display a first virtual image 9a, a first image display device 30a projects a first image onto a windshield 3 via the glare trap part. In order to display a second virtual image 9b having a different display distance, a second image display device 30b generates a second image on the functional film and projects the second image onto the windshield. For the functional film 51, a variable transmittance film having a light transmittance that varies according to the applied voltage or a transparent
(Continued)

self-luminous film in which an irradiated portion emits light when irradiated with a laser beam of a specific wavelength is used.

9 Claims, 18 Drawing Sheets

(51) Int. Cl.
    *B60K 35/00*      (2006.01)
    *G09G 5/377*      (2006.01)
    *G02B 26/02*      (2006.01)
    *G02F 1/13*      (2006.01)
    *G09G 5/02*      (2006.01)
    *G09G 5/14*      (2006.01)
    *G09G 3/00*      (2006.01)

(52) U.S. Cl.
    CPC ................. *G02F 1/13* (2013.01); *G09G 5/00* (2013.01); *G09G 5/377* (2013.01); *B60K 2370/1529* (2019.05); *B60K 2370/333* (2019.05); *B60K 2370/334* (2019.05); *B60K 2370/37* (2019.05); *B60K 2370/77* (2019.05); *G02B 2027/0118* (2013.01); *G02B 2027/0185* (2013.01); *G02B 2207/123* (2013.01); *G09G 3/002* (2013.01); *G09G 5/026* (2013.01); *G09G 5/14* (2013.01); *G09G 2340/10* (2013.01); *G09G 2340/12* (2013.01); *G09G 2340/14* (2013.01); *G09G 2380/10* (2013.01)

(56) References Cited

U.S. PATENT DOCUMENTS

| | | | | |
|---|---|---|---|---|
| 2011/0102303 | A1* | 5/2011 | Kakizaki | G02B 27/01 345/7 |
| 2012/0200476 | A1* | 8/2012 | Kanamori | G02B 27/0101 345/7 |
| 2012/0224062 | A1* | 9/2012 | Lacoste | G02B 27/01 348/148 |
| 2013/0265646 | A1* | 10/2013 | Sakai | G02B 27/01 359/631 |
| 2013/0293591 | A1* | 11/2013 | Miller | G03B 21/2033 345/690 |
| 2014/0036374 | A1* | 2/2014 | Lescure | G02B 27/0101 359/630 |
| 2014/0253821 | A1* | 9/2014 | Takatoh | B60K 35/00 349/11 |
| 2014/0320952 | A1* | 10/2014 | Chen | G02B 27/0101 359/303 |
| 2016/0124295 | A1* | 5/2016 | Montgomery | G02B 13/16 353/10 |
| 2016/0327788 | A1 | 11/2016 | Yamaoka | |
| 2016/0363764 | A1* | 12/2016 | Ting | G02B 5/30 |
| 2018/0120562 | A1* | 5/2018 | Yata | G02B 27/283 |
| 2018/0157036 | A1* | 6/2018 | Choi | G02B 27/0179 |

FOREIGN PATENT DOCUMENTS

| | | |
|---|---|---|
| JP | 2013-011645 A | 1/2013 |
| JP | 2015-225118 A | 12/2015 |

* cited by examiner

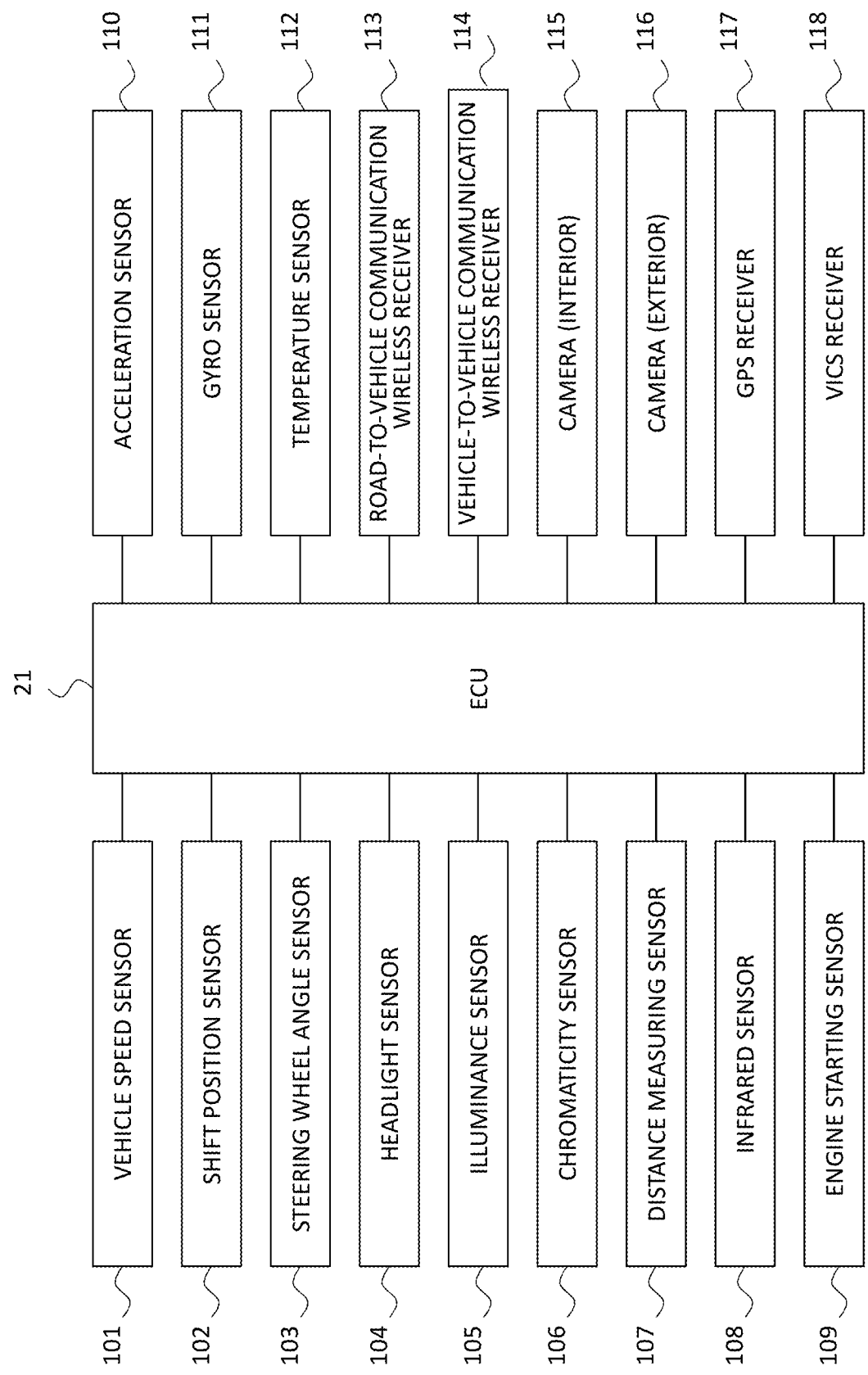

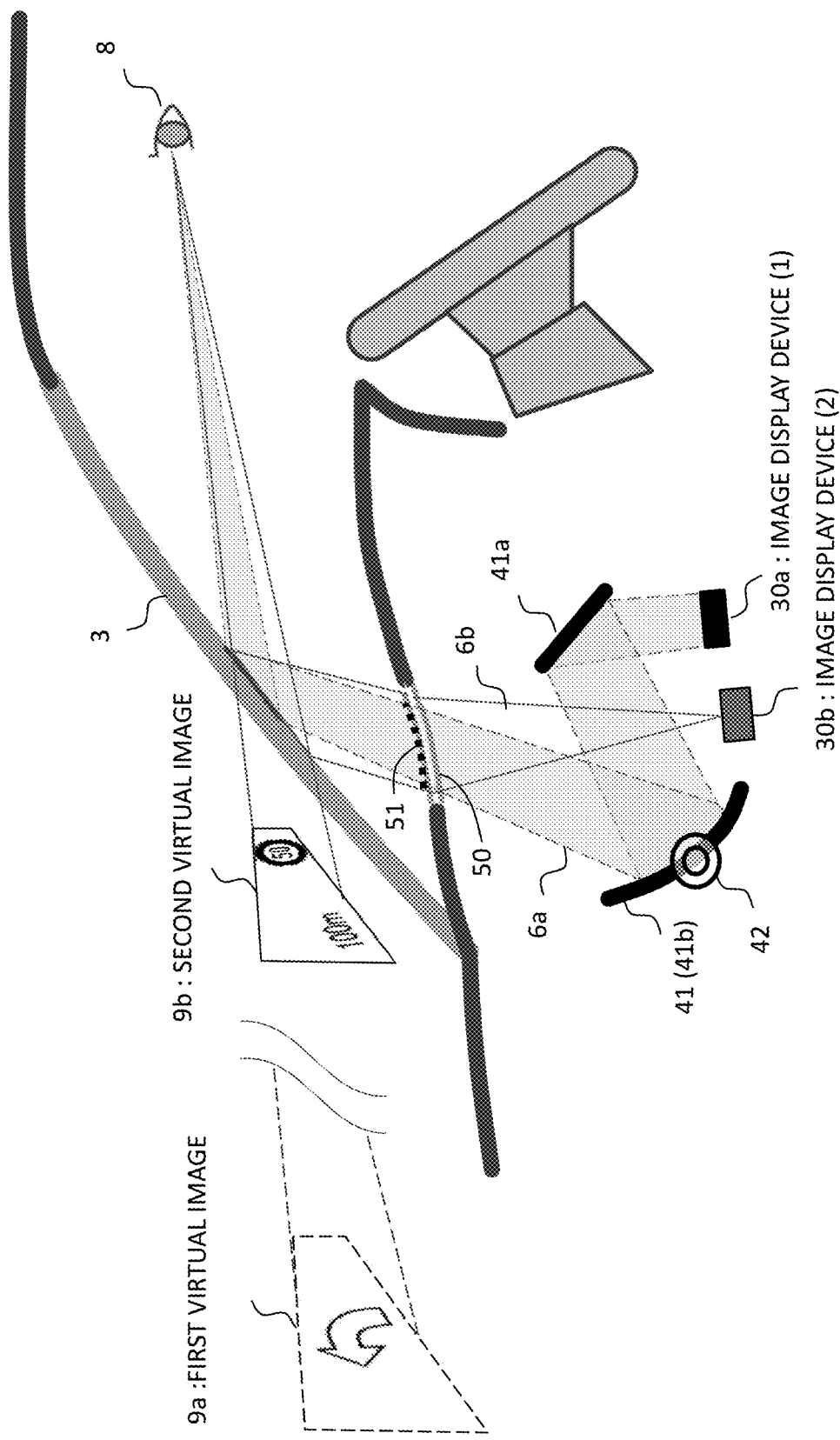

FIG. 9
SIMULTANEOUS DISPLAY OF FAR AND NEAR VIRTUAL IMAGES
(a) FUNCTIONAL FILM CONFIGURATION (1)
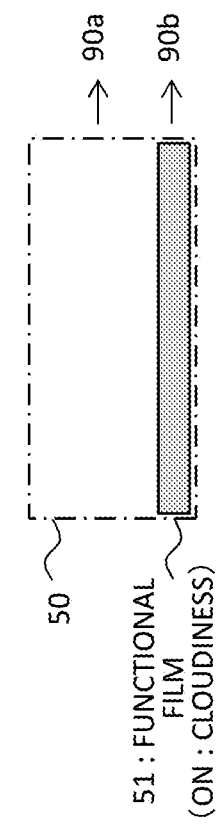
(c) DISPLAY STATE
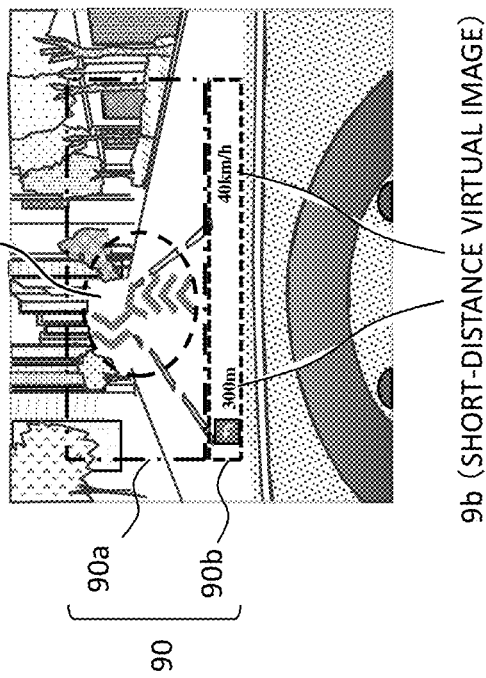
(b) FUNCTIONAL FILM CONFIGURATION (2)
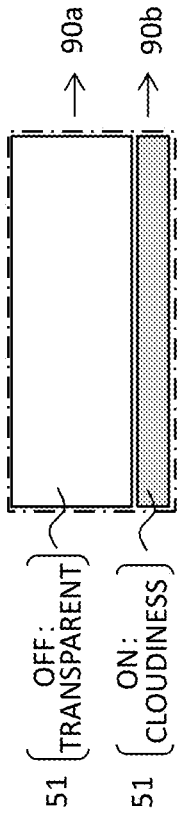

FIG. 12
ALTERNATE DISPLAY OF FAR AND NEAR VIRTUAL IMAGES
(a) EMIT LONG-DISTANCE IMAGE    (b) EMIT SHORT-DISTANCE IMAGE
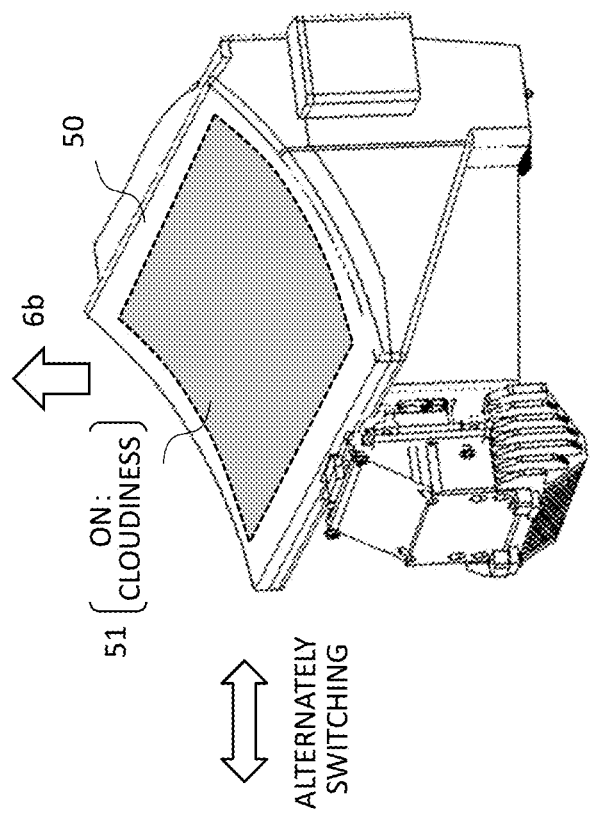
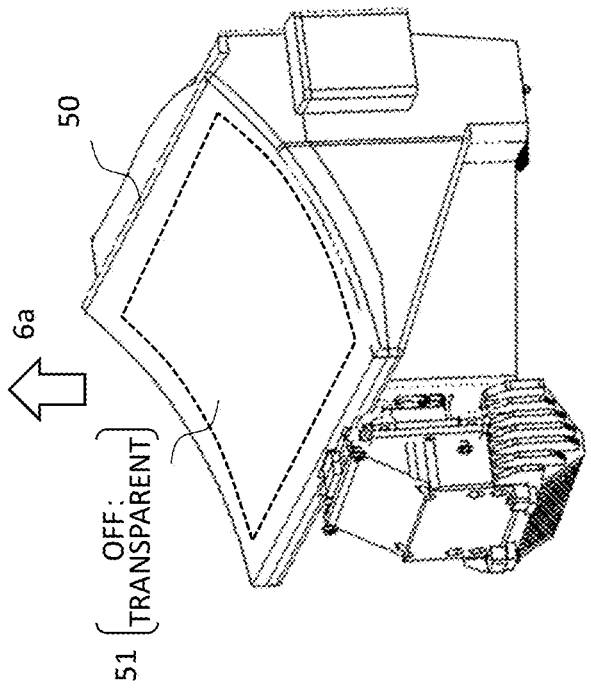

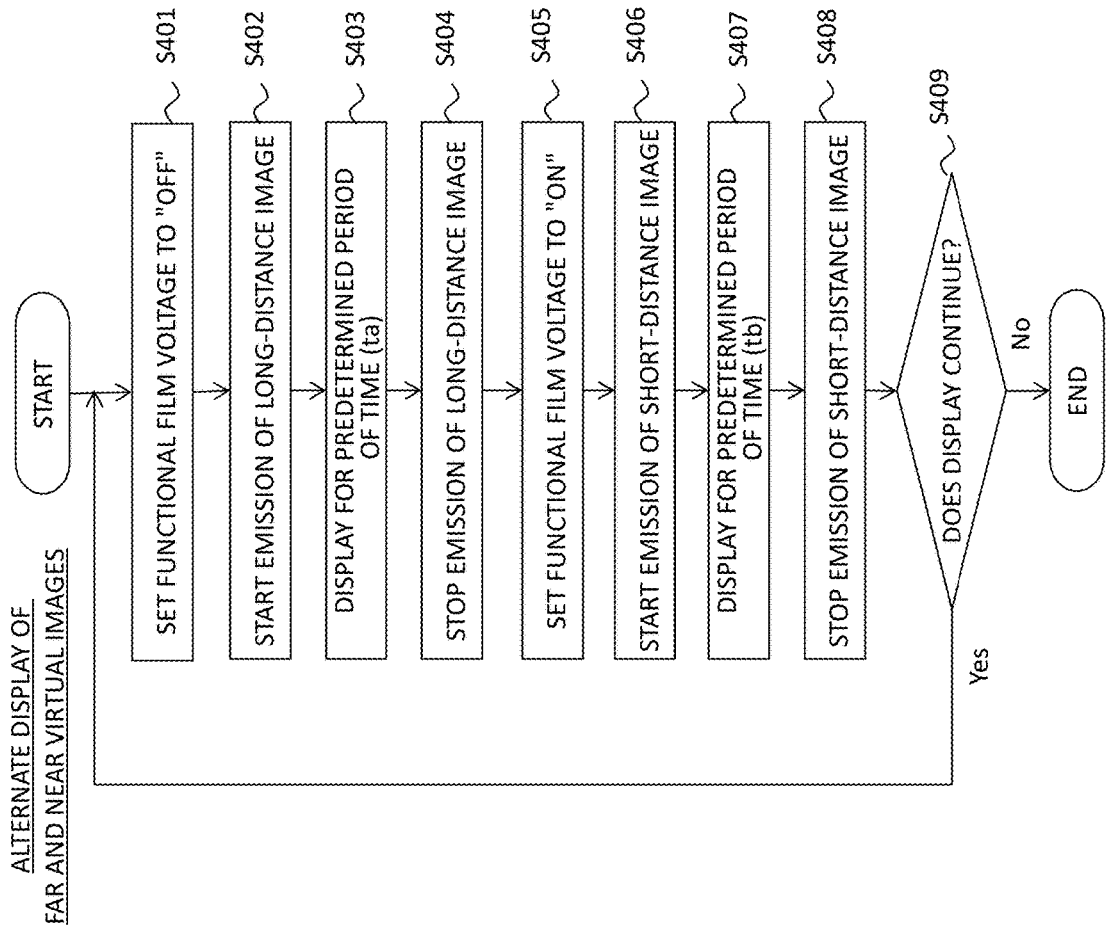

HEAD-UP DISPLAY APPARATUS HAVING A FUNCTIONAL FILM WITH A CONTROLLABLE TRANSMITTANCE

TECHNICAL FIELD

The present invention relates to a head-up display apparatus mounted on a vehicle or the like to display various types of image information.

BACKGROUND ART

In recent years, as one of techniques for overlappingly displaying images in a realistic space, a head-up display (HUD) for displaying various types of information on a front glass (also referred to as "windshield") of a vehicle has been put to a practical use. For example, by providing information dedicated to a driver as the image information to be displayed, it is possible to support a driving operation of the vehicle.

In a basic configuration of the HUD, an optically generated image is projected to a front glass using a concave mirror, and the reflected image light beam is incident to a driver's eye, so that the driver visually recognizes a virtual image of the image light beam in front of the front glass. In this case, a device capable of changing a position of the virtual image visually recognized by the driver, that is, displaying the image in both long and short distances from the front glass has been proposed.

For example, Patent Document 1 discloses a configuration in which two channels of image display systems are provided, and optical path lengths from a concave mirror to each liquid crystal display panel are arranged differently, so that distances to the two displayed virtual images are changed.

CITATION LIST

Patent Document

Patent Document 1: JP 2013-11645 A

SUMMARY OF THE INVENTION

Problems to be Solved by the Invention

In the virtual image display apparatus described in Patent Document 1, although both the long-distance display and the short-distance display can be used, display systems having nearly the same performance (including light sources and liquid crystal display units) are arranged in two channels, so that the size of the entire apparatus increases disadvantageously. For this reason, it is difficult to house a larger-sized apparatus in a dashboard having a limited space in some cases. In addition, since it is necessary to provide a half mirror that transmits the display light of one of the two channels and reflects the display light of the other channel, light use efficiency is degraded. Accordingly, the size of the light source increases, the power consumption increases, and the radiated heat amount increases, disadvantageously.

An object of the invention is to provide a miniaturized head-up display apparatus capable of using both long-distance display and short-distance display without necessity of a half mirror.

Solutions to Problems

According to the present invention, there is provided a head-up display apparatus mounted on a vehicle to display a first virtual image and a second virtual image having different display distances forward of a windshield, including: a functional film attached to a glare trap part of the head-up display apparatus; a first image display device configured to project a first image to the windshield through the glare trap part to display the first virtual image; and a second image display device configured to create a second image on the functional film and project the second image to the windshield to display the second virtual image.

Effects of the Invention

According to the present invention, it is possible to provide a miniaturized head-up display apparatus capable of using both long-distance display and short-distance display without necessity of a half mirror.

BRIEF DESCRIPTION OF THE DRAWINGS

FIG. 2 is a diagram illustrating an example of a hardware configuration for obtaining vehicle information.

FIG. 4 is a schematic diagram illustrating an image display state using the HUD apparatus.

FIG. 9 is a diagram illustrating simultaneous display of far and near virtual images.

FIG. 12 is a diagram illustrating a method of alternately displaying far and near virtual images.

FIG. 14 is a flowchart illustrating an alternate display operation of far and near virtual images.

MODE FOR CARRYING OUT THE INVENTION

First, a basic configuration of a head-up display apparatus having two channels of image display systems will be described.

Figure 1:
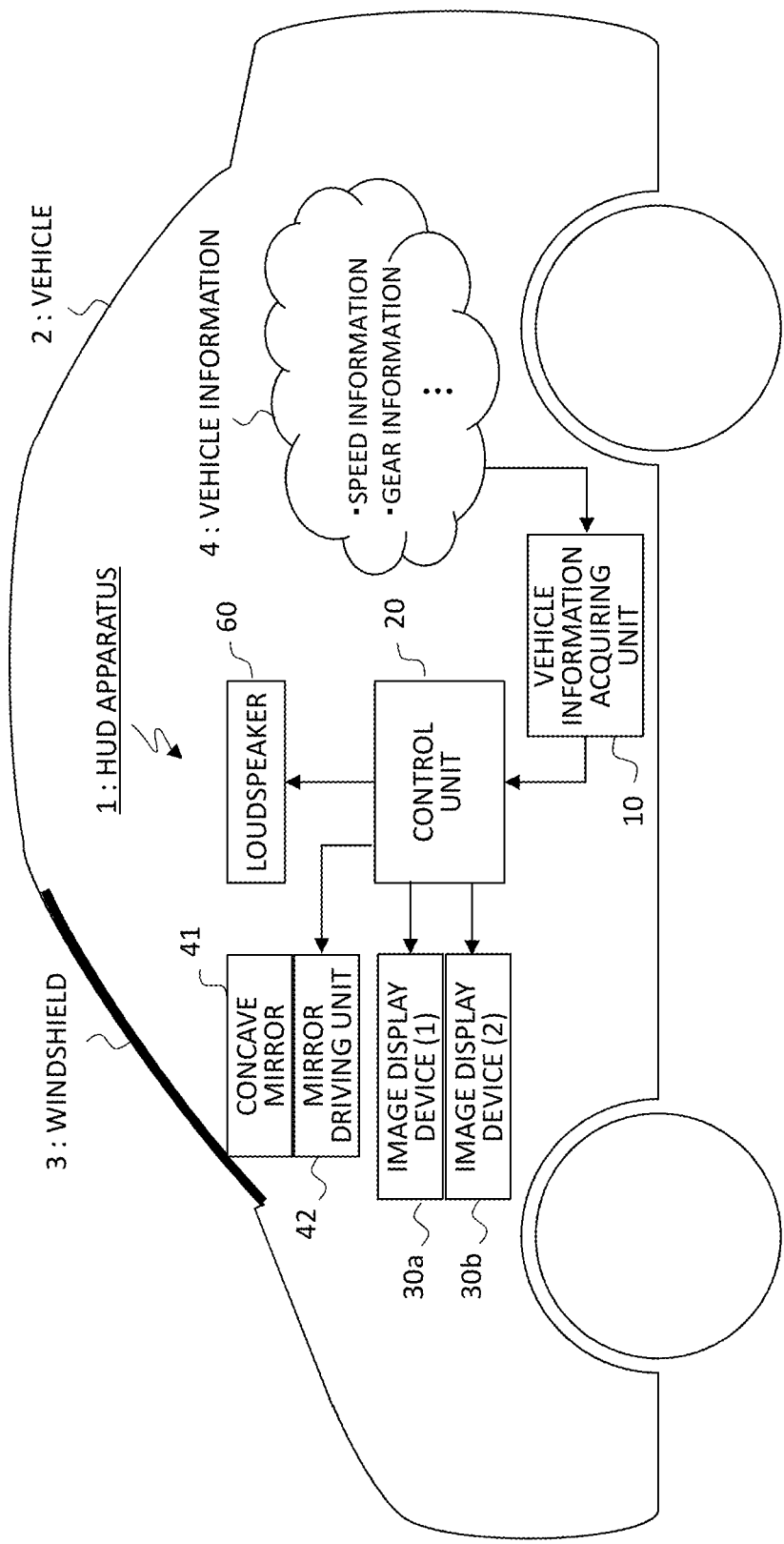
FIG. 1 is a schematic diagram illustrating a head-up display (HUD) apparatus mounted on a vehicle.

FIG. 1 is a schematic diagram for describing an outline of the head-up display apparatus (hereinafter, abbreviated as "HUD apparatus") mounted on a vehicle. An HUD apparatus 1 mounted on a vehicle 2 projects respective image light beams generated from two channels of image display devices 30a and 30b onto a front glass (hereinafter, referred to as "windshield" 3) of the vehicle 2. The image light beam reflected by the windshield 3 is incident to a driver's eye, and the driver visually recognizes the image from the HUD. The displayed image includes information regarding a driving operation to support the driving operation. The HUD apparatus 1 internally has a vehicle information acquiring unit 10 that acquires various types of vehicle information 4, a control unit 20 that generates image information to be displayed on the basis of the vehicle information 4, a concave mirror 41 that reflects an image light beam, a mirror driving unit 42 that drives the concave mirror 41, a loudspeaker 60 that outputs sound information to a driver, and the like. The vehicle information 4 contains information representing a driving state of the vehicle, such as speed information or gear information.

FIG. 2 is a diagram illustrating an example of a hardware configuration for acquiring the vehicle information 4 in the HUD apparatus 1. Here, a part of the hardware configuration of the vehicle information acquiring unit 10 and the control unit 20 will be mainly illustrated. The vehicle information 4 is acquired by information acquiring devices such as various sensors connected to an electronic control unit (ECU) 21, for example, under control of the ECU 21 in the control unit 20. The information acquiring device includes the following things.

A vehicle speed sensor 101 acquires speed information of the vehicle 2. A shift position sensor 102 acquires the current gear information of the vehicle 2. A steering wheel angle sensor 103 acquires steering wheel angle information. A headlight sensor 104 acquires lamp lighting information regarding "ON/OFF" states of a headlight. An illuminance sensor 105 and a chromaticity sensor 106 acquire ambient light information. A distance measuring sensor 107 acquires distance information between the vehicle 2 and an external object. An infrared sensor 108 acquires infrared information regarding presence/absence, distance, or the like of an object at a short distance of the vehicle 2. An engine starting sensor 109 detects engine ON/OFF information.

An acceleration sensor 110 and a gyro sensor 111 acquire acceleration or gyro information including an acceleration or an angular velocity as information of a posture or behavior of the vehicle 2. A temperature sensor 112 acquires temperature information inside or outside the vehicle. A road-to-vehicle communication wireless receiver 113 and a vehicle-to-vehicle communication wireless receiver 114 acquire road-to-vehicle communication information received via road-to-vehicle communication between the vehicle 2 and a road, a sign, a signal, or the like and vehicle-to-vehicle communication information received via vehicle-to-vehicle communication between the vehicle 2 and another neighboring vehicle.

A camera (interior of the vehicle) 115 and a camera (exterior of the vehicle) 116 capture a video of internal and external situations of the vehicle to acquire camera image information (interior/exterior of the vehicle). The camera (interior of the vehicle) 115 captures, for example, a posture, an eye position, a motion, or the like of the driver. By analyzing the obtained video, it is possible to check, for example, a fatigue status, a position of the line of sight of the driver, or the like. In addition, the camera (exterior of the vehicle) 116 captures a surrounding situation such as a front or rear side of the vehicle 2. By analyzing the obtained video, it is possible to check, for example, presence/absence of a moving object such as other vehicles or people in the surroundings, a building, a terrain, or road condition (such as rain, snow, freezing, or irregularity) or the like.

A GPS receiver 117 and a vehicle information and communication system (VICS, registered trademark (similarly applied in the following description)) receiver 118 acquire GPS information obtained by receiving a GPS signal and VICS information obtained by receiving a VICS signal, respectively. They may be embedded in a part of a car navigation system to be used by acquiring such types of information.

Note that, although it is assumed that various devices are provided outside the HUD, they may be provided inside the HUD. In addition, all of these devices are not necessarily provided, and other types of devices may be provided.

First Embodiment

In the first embodiment, a configuration will be described, in which two channels of image display devices 30a and 30b display a long-distance virtual image and a short-distance virtual image, respectively. The image display device for a short-distance virtual image is provided with a functional film in a device opening to project a created image onto a functional film surface. In the first embodiment, a case where a variable transmittance film having a transmittance changing according to an applied voltage is employed as the functional film will be described.

Figure 3A:
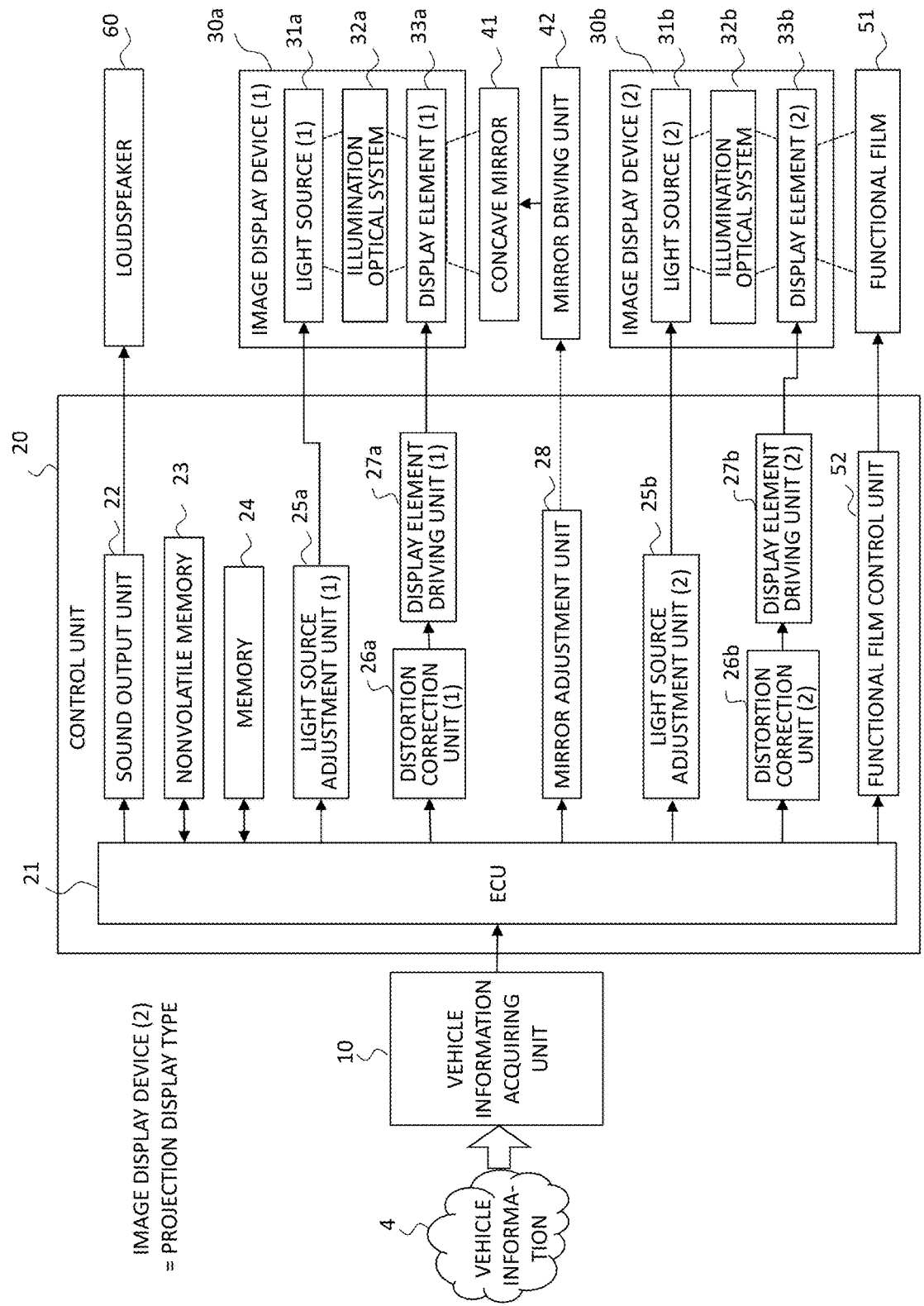
FIG. 3A is a block diagram illustrating an internal configuration of an HUD apparatus (projection display type).
Figure 3B:
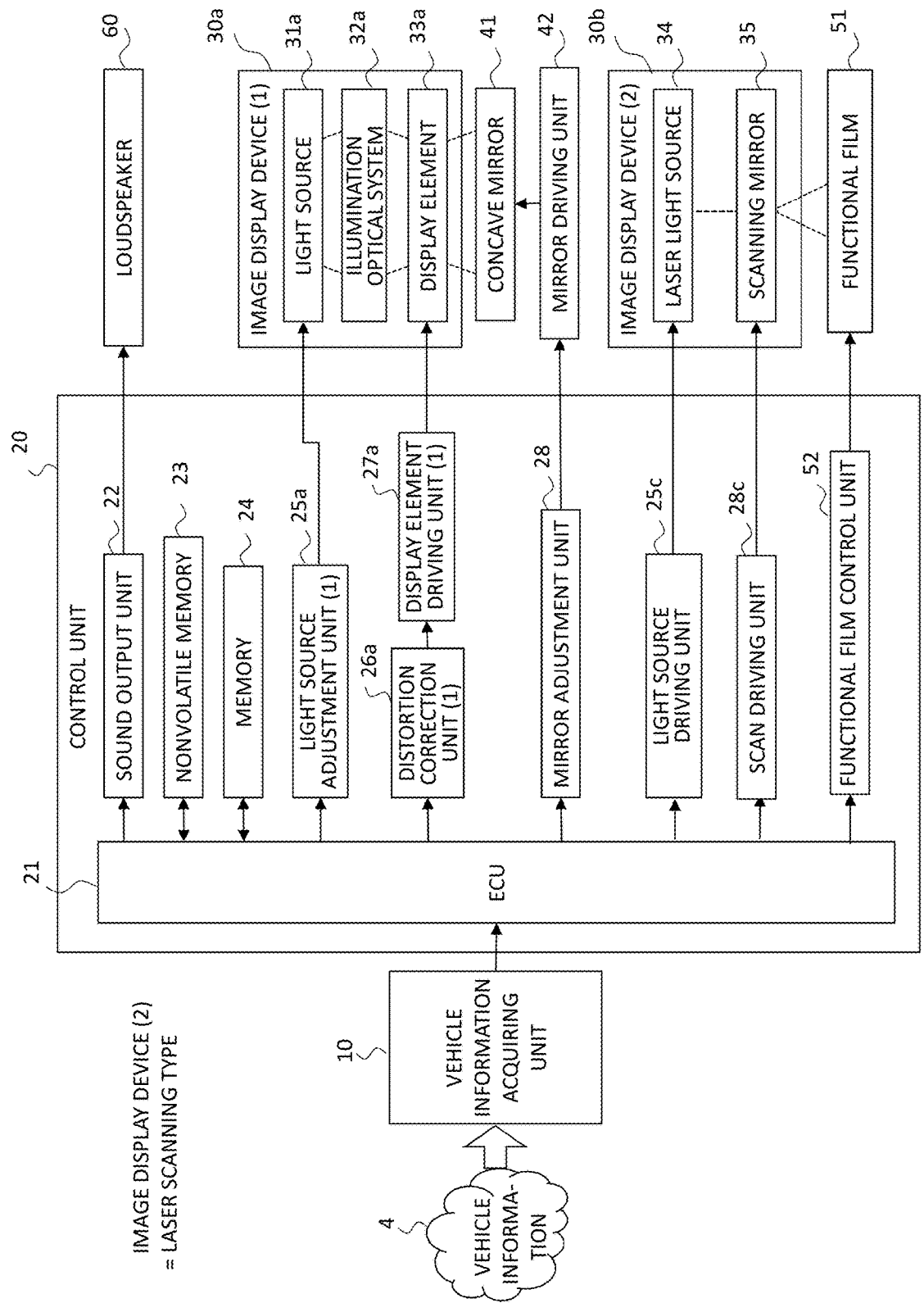
FIG. 3B is a block diagram illustrating an internal configuration of an HUD apparatus (laser scanning type).

FIGS. 3A and 3B are block diagrams illustrating an internal configuration of the HUD apparatus 1. The HUD apparatus 1 has two channels of image display devices 30a and 30b, in which the first image display device 30a is used for long-distance display, and the second image display device 30b is used for short-distance display, and elements of respective channels will be referred to as "first" and "second" elements.

Although two types of display types can be used for the second image display device 30b, both of them are configured such that a second image is created on a functional film 51 provided on an opening of the HUD apparatus 1, and is projected onto the windshield 3. FIG. 3A illustrates a method of projecting a second image light beam generated on the image display element (such as a liquid crystal panel) to the functional film 51 (projection display type). FIG. 3B illustrates a method of creating a second image by scanning a laser beam to the functional film 51 (laser scanning type). Hereinafter, each of the types will be described.

In the projection display type of FIG. 3A, the first and second image display devices 30a and 30b have light sources 31a and 31b such as an LED, illumination optical systems 32a and 32b, display elements 33a and 33b such as a liquid crystal element, respectively. The first image light beam generated from the first display element 33a is reflected on the concave mirror 41 and is then emitted from a glare trap part (antiglare plate) formed of a material capable of covering the opening of the HUD apparatus 1 and transmitting the image light beam. The second image light beam generated from the second display element 33b is projected to the glare trap part (antiglare plate) without using the concave mirror 41.

The functional film (variable transmittance film) 51 is attached to the glare trap part, and for the first image light beam, the first image light beam to be incident directly transmits by making the functional film 51 transparent. For the second image light beam, the second image is created on the film surface by making the functional film 51 opaque (cloudiness state). As a result, a first image for a long distance and a second image for a short distance are created.

Various types of vehicle information 4 are input to the vehicle information acquiring unit 10 and are transmitted to the control unit 20. The electronic control unit (ECU) 21 in the control unit 20 generates two-channel image signals for long-distance display and short-distance display displayed by the HUD apparatus 1 on the basis of the input vehicle information 4. In addition, a control signal for the concave mirror 41 or a sound signal for the loudspeaker 60 is generated on the basis of the vehicle information 4.

The control unit 20 internally has a sound output unit 22 that outputs a sound signal to the loudspeaker 60, a non-volatile memory 23 that stores a program executed by the ECU 21, and a memory 24 that stores image information or control information. The first and second image display devices 30a and 30b have light source adjustment units 25a and 25b that control the respective light sources 31a and 31b, distortion correction units 26a and 26b that correct a distortion in each of the displayed image signals, and display element driving units 27a and 27b that drive the respective display elements 33a and 33b on the basis of the corrected image signal, respectively.

The first image display device 30a has a mirror adjustment unit 28 that outputs a drive signal to the mirror driving unit 42 for driving the concave mirror 41. A functional film control unit 52 controls a transmittance (transparent/cloudiness) of the functional film 51 by switching a voltage applied to the functional film 51.

In the laser scanning type illustrated in FIG. 3B, the second image display device 30b has a laser light source 34 and a scanning mirror 35 that scans a laser beam in a two-dimensional manner. The scanning mirror 35 is formed, for example, using a micro-electro-mechanical system (MEMS). The control unit 20 has a light source driving unit 25c that drives the laser light source 34 depending on an image signal level, and a scan driving unit 28c that drives the scanning mirror 35 depending on horizontal and vertical synchronous signals of the image signal.

The laser beam reflected on the scanning mirror 35 is used to scan the functional film 51 depending on the image signal. In this case, a second image is created on the film surface by making the functional film 51 opaque (cloudiness state) using the functional film control unit 52.

In both the projection display type of FIG. 3A and the laser scanning type of FIG. 3B, since a half mirror is not necessary for projecting the first and second image light beams, there is no degradation in the light use efficiency caused by the use of the half mirror. In addition, since an emission optical system of the second image display device 30b side does not have a concave mirror, it can be miniaturized using a configuration simpler than that of the emission optical system of the first image display device 30a side. In particular, in the laser scanning type of FIG. 3B, since an illumination optical system is not necessary in the image display device, compared to the projection display type of FIG. 3A, further miniaturization is possible. As a result, it is possible to implement a miniaturized HUD apparatus capable of displaying images of two channels for both long and short distances.

FIG. 4 is a schematic diagram illustrating an image display state caused by the HUD apparatus 1. The first and second image light beams are emitted from the first and second image display devices 30a and 30b, respectively, provided inside a dashboard of the vehicle 2. The second image display device 30b may be any one of the "projection display type" illustrated in FIG. 3A or the "laser scanning type" illustrated in FIG. 3B. In this drawing, the image of the "laser scanning type" of FIG. 3B is illustrated.

A first image light beam 6a emitted from the first image display device 30a is reflected on first and second mirrors 41a and 41b and is projected to a glare trap part 50. The first mirror 41a is fixed, and the second mirror 41b has a concave shape (including a free-form surface shape and an optical axis asymmetric shape), so as to be rotatable by the mirror driving unit 42. In the following description, the second mirror 41b will be simply referred to as a "concave mirror 41". Meanwhile, the second image light beam 6b emitted from the second image display device 30b is directly projected to the glare trap part 50.

The functional film 51 is attached to the glare trap part 50, and the transmittance is changed by applying a voltage. When the first image light beam 6a is projected, the functional film 51 is set to a transparent state, so that the first image light beam 6a directly transmits. When the second image light beam 6b is projected, the functional film 51 is set to a cloudiness state to scatter the light, so that a second image is created at that position.

The first image light beam 6a passes through the functional film 51 having a transparent state, is reflected on the windshield 3, is incident to a driver's eye 8, and is focused on the retina, so that the image can be visually recognized. In this case, the driver sees a first virtual image 9a provided forward of the windshield 3. A position of the first virtual image 9a visually recognized by the driver is determined by a distance from the first display element 33a which is an image formation surface of the first image display device 30a and a magnification ratio of the projection lens (omitted in the drawing) arranged in the optical path, so that the first virtual image 9a is displayed in the long-distance position from the windshield 3. In the following description, the first virtual image 9a will be referred to as a "long-distance virtual image 9a".

Meanwhile, the second image light beam 6b is irradiated onto the functional film 51 having the cloudiness state, so that a second image is created at that position. The created second image is reflected on the windshield 3 and is incident to the driver's eye 8 so as to be visually recognized. In this case, the driver visually recognizes the second virtual image 9b provided forward of the windshield 3. However, since the position of the second virtual image 9b to be visually recognized is determined on the basis of the distance from the functional film 51 (glare trap part 50) which is the image formation surface, the second virtual image 9b is displayed in the short-distance position from the windshield 3 (in this case, the projection lens is not used). In the following description, the second virtual image 9b will be referred to as a "short-distance virtual image 9b".

In this manner, the functional film 51 is attached to the glare trap part 50, and is switched between the transparent state and the cloudiness state by applying a voltage. When the long-distance virtual image 9a is displayed, the functional film 51 is set to a transparent state, and the first image light beam 6a is projected from the first image display device 30a for long-distance display. When the short-distance virtual image 9b is displayed, the functional film 51 is set to a cloudiness state, and the second image light beam 6b is projected from the second image display device 30b for short-distance display. In this manner, the virtual images for both long-distance display and short-distance display can be displayed switchably.

Note that, the long-distance virtual image and the short-distance virtual image can be simultaneously displayed in the functional film absence region and the functional film presence region (having a cloudiness state), respectively, by partially attaching the functional film 51 to the glare trap part 50 as described below.

Figure 5:
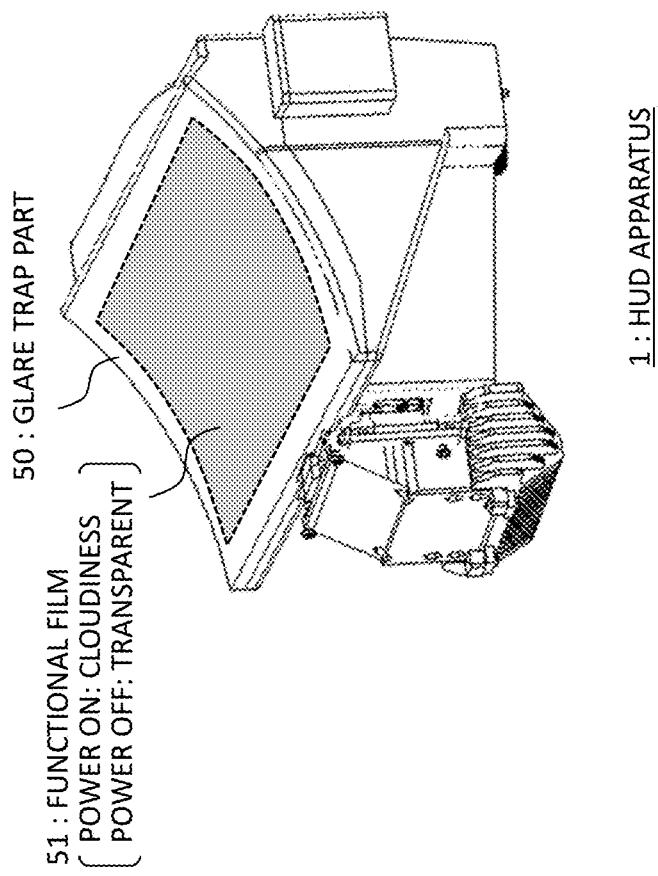
FIG. 5 is a diagram illustrating an exterior of the HUD apparatus.

FIG. 5 is a diagram illustrating an exterior of the HUD apparatus. The first and second image light beams emitted from the HUD apparatus 1 are projected upward in the drawing from the glare trap part 50. An opening through which the image light beam is projected to the windshield 3 is formed on the top surface of the external casing of the HUD apparatus 1. This opening is covered by the glare trap part 50 (antiglare plate). The glare trap part 50 is formed of a concave-shaped material capable of transmitting the image light beam and is a part for providing an antiglare effect to the ambient light. According to this embodiment, the functional film 51 is attached to the entire area or a partial area on the outer or inner side of the glare trap part 50. In this drawing, it is assumed that the functional film 51 is attached to nearly the entire area of the glare trap part 50.

The functional film 51 is a variable transmittance film having a transmittance (transparent/cloudiness) according to the applied voltage and is also called a functional liquid crystal film or a light control film. The functional film 51 includes a type in which the transmittance increases by applying a voltage and a type in which the transmittance decreases by applying a voltage. Although any type can be employed in this embodiment, in the following description, it is assumed that the latter type, that is, the type in which the functional film 51 is changed to the cloudiness state by applying a voltage (ON), and the functional film 51 changed to the transparent state by applying a voltage (OFF).

Figure 6:
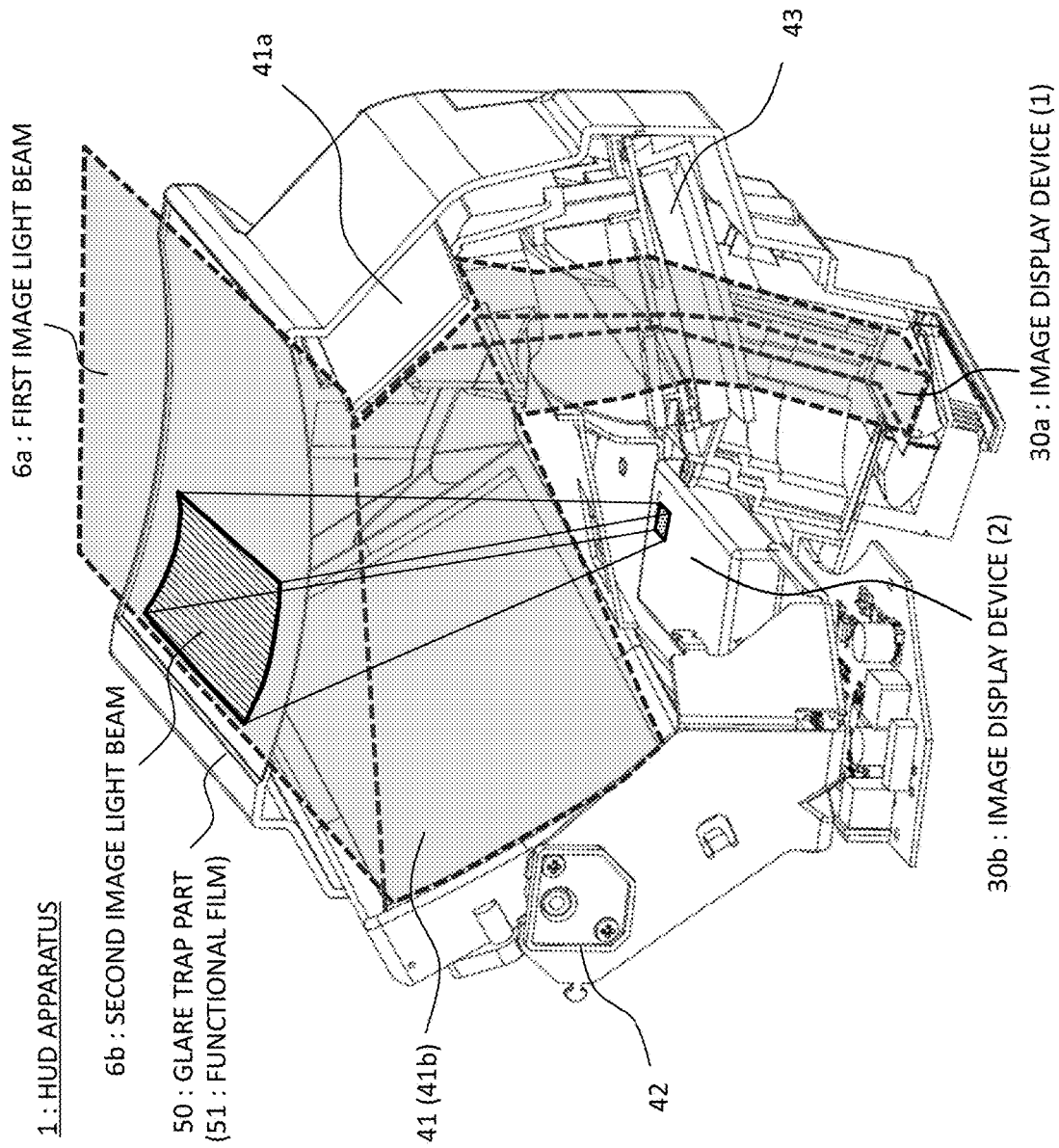
FIG. 6 is a diagram illustrating an internal structure of the HUD apparatus and an optical path of image light beams.

FIG. 6 is a diagram illustrating an internal structure of the HUD apparatus 1 and an optical path of the image light beam. The first and second image display devices 30a and 30b are arranged in the lower part of the HUD apparatus 1. The functional film 51 is attached to the upper glare trap part 50.

The first image light beam 6a (indicated by a broken line and shaded in gray) emitted from the first image display device 30a is enlarged by a projection lens 43, is reflected on the first and second mirrors 41a and 41b (concave mirror 41), and is projected from the glare trap part 50. Meanwhile, the second image light beam 6b (indicated by a solid line) emitted from the second image display device 30b is directly emitted to the glare trap part 50.

When the functional film 51 attached to the glare trap part 50 has a transparent state, the first image light beam 6a is directly projected upward. In comparison, when the functional film 51 attached to the glare trap part 50 has a cloudiness state, a second image is created by the second image light beam 6b inside the film and is projected upward. In this drawing, the second image creation region is set as a part of the glare trap part 50 (functional film 51).

According to this configuration, since the second image display device 30b has a small emission optical system, there is a little constraint in arrangement, it can be arranged in a space excluding the first image display device 30a. Therefore, it is possible to implement a small HUD apparatus 1 having two channels of image display devices.

Figure 7:
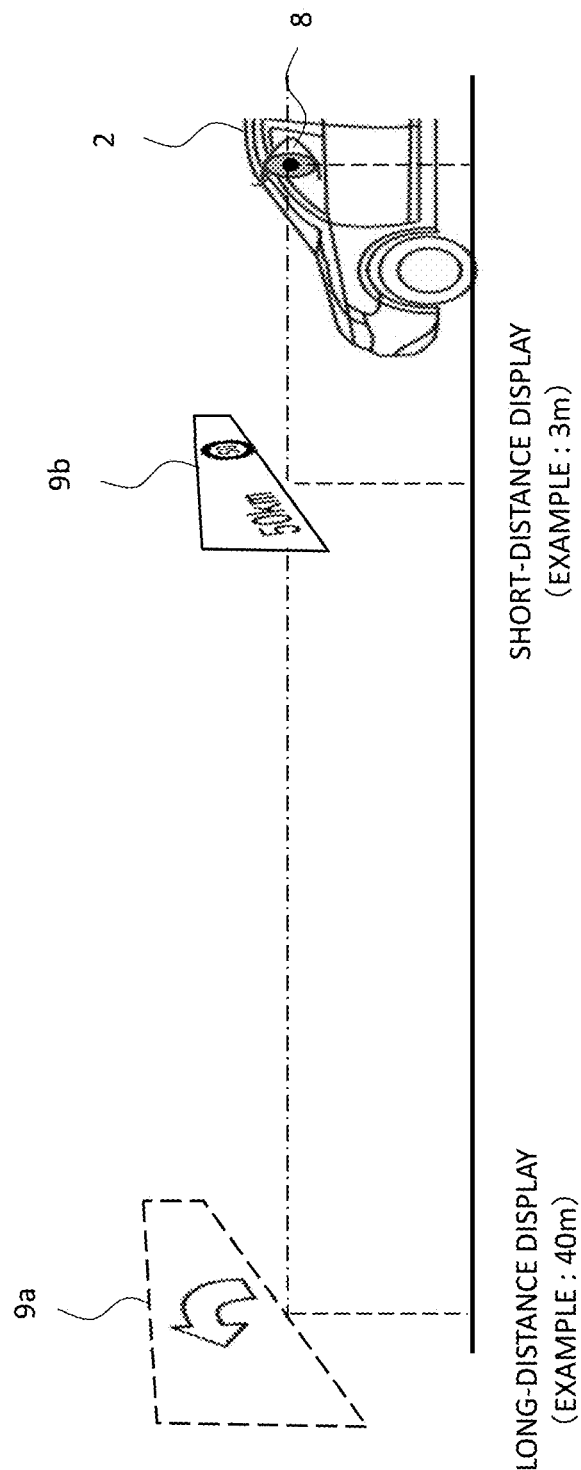
FIG. 7 is a diagram illustrating display positions of far and near virtual images.

FIG. 7 is a diagram illustrating display positions of far and near virtual images. When the functional film 51 is in a transparent state, and an image is projected from the first image display device 30a, the first virtual image 9a seen from the driver's eye 8 in the vehicle 2 is displayed at a long distance (for example, 40 m ahead). This display distance is variable by selecting the projection lens 43 and adjusting the lens position. In comparison, when the functional film 51 is in the cloudiness state, and an image is emitted from the second image display device 30b, the second virtual image 9b is displayed at a short distance (for example, 3 m ahead). This display distance is determined on the basis of a distance from the position of the driver's eye 8 to the windshield 3 and a distance from the windshield 3 to the glare trap part 50 attached with the functional film 51. Therefore, it is possible to change the display distance by changing the position of the glare trap part 50. The first and second virtual images 9a and 9b are present on nearly the same line of sight as seen from the driver's eye 8. Note that, the image to be displayed at a long distance is mainly information displayed overlappingly on an actual view. In addition, the image displayed at a short distance is mainly information displayed without overlapping on the actual view such as speed, distance, or sign information.

Figure 8:
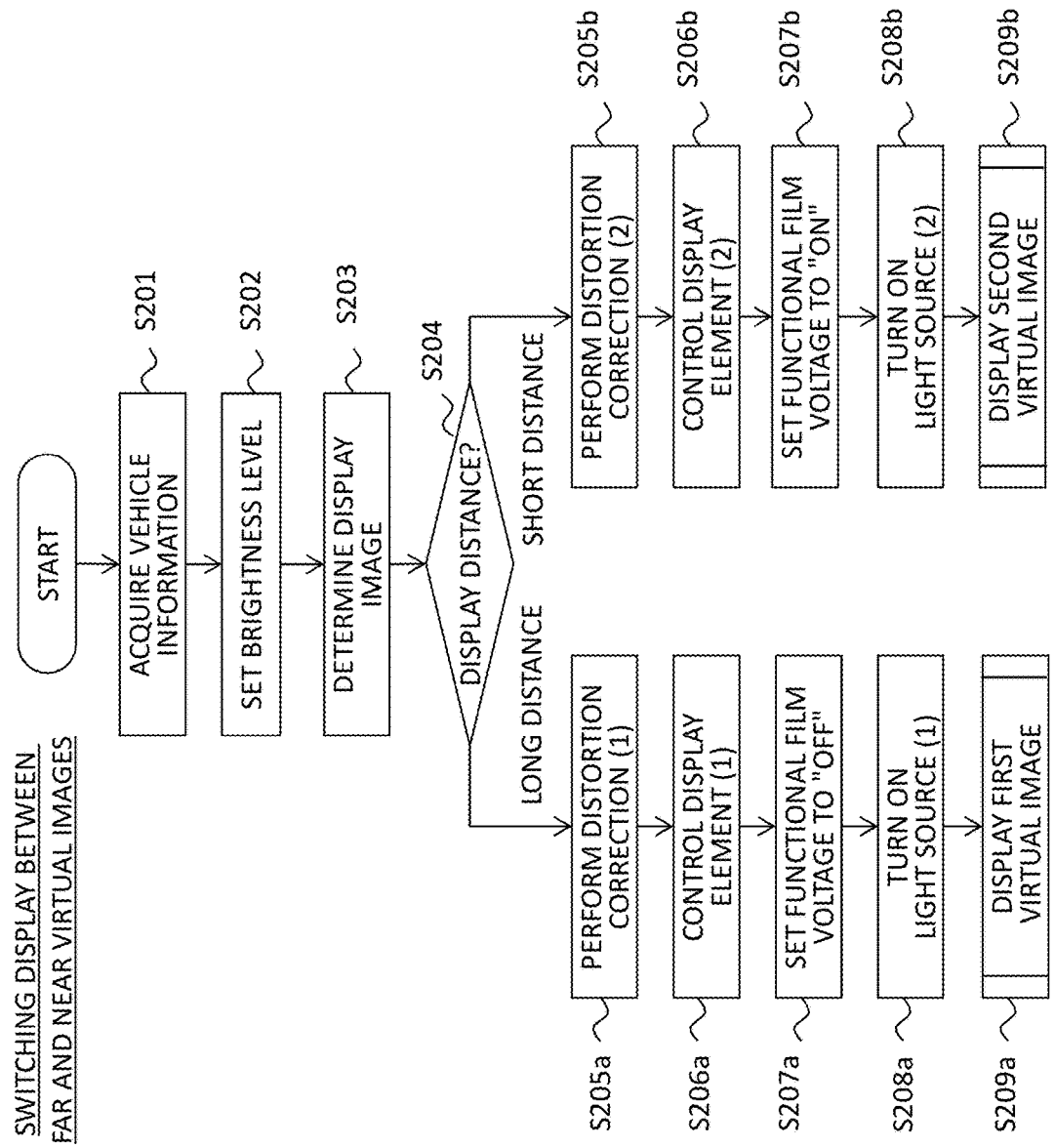
FIG. 8 is a flowchart illustrating display switching between far and near virtual images.

FIG. 8 is a flowchart illustrating display switching between the far and near virtual images. The display distance is automatically switched depending on the type of the image to be displayed. The following processing is controlled by the electronic control unit (ECU) 21 of the control unit 20. Note that, the short-distance display type is the case of the projection display type of FIG. 3A.

As a power (ignition) ON signal is received by the engine starting sensor 109, the vehicle information acquiring unit 10 acquires the vehicle information 4 (S201). First, an appropriate brightness level is calculated from ambient light information by the illuminance sensor 105, and the brightness levels of the light sources 31a and 31b are set by controlling the light source adjustment units 25a and 25b (S202). In addition, information selected by the driver is extracted from the acquired vehicle information 4 (for example, current vehicle speed information) to determine an image to be displayed (S203).

If the display image is determined, it is determined whether a distance for displaying the image is at a long distance or a short distance (S204). For this reason, the nonvolatile memory 23 stores a relationship between the type of the display image and the display distance in advance. For example, the information displayed overlappingly on an actual view, such as a situation of a forward road (lane marking or the like), is set as the long-distance display, and the information displayed not overlappingly on an actual view, such as vehicle speed information, is set as the short-distance display. The process branches depending on which one of the long-distance display or the short-distance display is performed.

In the case of the long-distance display, an image distortion generated by a projection optical system (for example, a curved shape of the windshield 3) in the image to be displayed is corrected using the first distortion correction unit 26a (S205a). A driving signal is supplied to the first display element 33a by the display element driving unit 27a (S206a). In addition, the functional film control unit 52 sets the applied voltage of the functional film 51 to "OFF" to make the film a transparent state (S207a).

As the ON signal of the HUD display is received, the light source 31a of the first image display device 30a is turned on (S208a), and the first virtual image for a long distance is displayed (S209a).

In the case of the short-distance display, an image distortion generated by the projection optical system in the image to be displayed is corrected using the second distortion correction unit 26b (S205b). A driving signal is supplied to the second display element 33b by the display element driving unit 27b (S206b). In addition, the functional film control unit 52 sets the applied voltage of the functional film 51 to "ON" to make the film a cloudiness state (S207b).

As the ON signal of the HUD display is received, the light source 31*b* of the second image display device 30*b* is turned on (S208*b*), and the second virtual image for a short distance is displayed (S209*b*).

In the aforementioned display method, any one of the long-distance virtual image or the short-distance virtual image is selectively displayed. Alternatively, both the long-distance virtual image and the short-distance virtual image can also be simultaneously displayed by segmenting the display region.

FIG. 9 is a diagram illustrating simultaneous display of the far and near virtual images. (a) and (b) of FIG. 9 illustrate an example of the attachment configuration of the functional film 51, and (c) of FIG. 9 illustrates display states of the far and near virtual images seen from the inside of the vehicle.

As illustrated in (c) of FIG. 9, a display region 90 of the virtual image is segmented into a long-distance display region 90*a* and a short-distance display region 90*b*. In addition, the long-distance virtual image 9*a* and the short-distance virtual image 9*b* emitted from the first and second image display devices 30*a* and 30*b*, respectively, are simultaneously displayed on the respective regions.

As a functional film 51 for implementing this configuration, as illustrated in (a) of FIG. 9, the functional film 51 is attached to only a region of the glare trap part 50 corresponding to the short-distance display region 90*b*, and the functional film 51 is set to the cloudiness state by setting an "ON" voltage. Alternatively, as illustrated in (b) of FIG. 9, the functional film 51 is attached to the entire surface of the glare trap part 50 and is set to the cloudiness state by setting the "ON" voltage only in a region corresponding to the short-distance display region 90*b*. In addition, the first and second images may be simultaneously emitted from the first and second image display devices 30*a* and 30*b*, respectively. Note that, according to the configuration of (b) of FIG. 9, the sizes of the far and near display regions can be variable by changing the area of the voltage application region.

Figure 10:
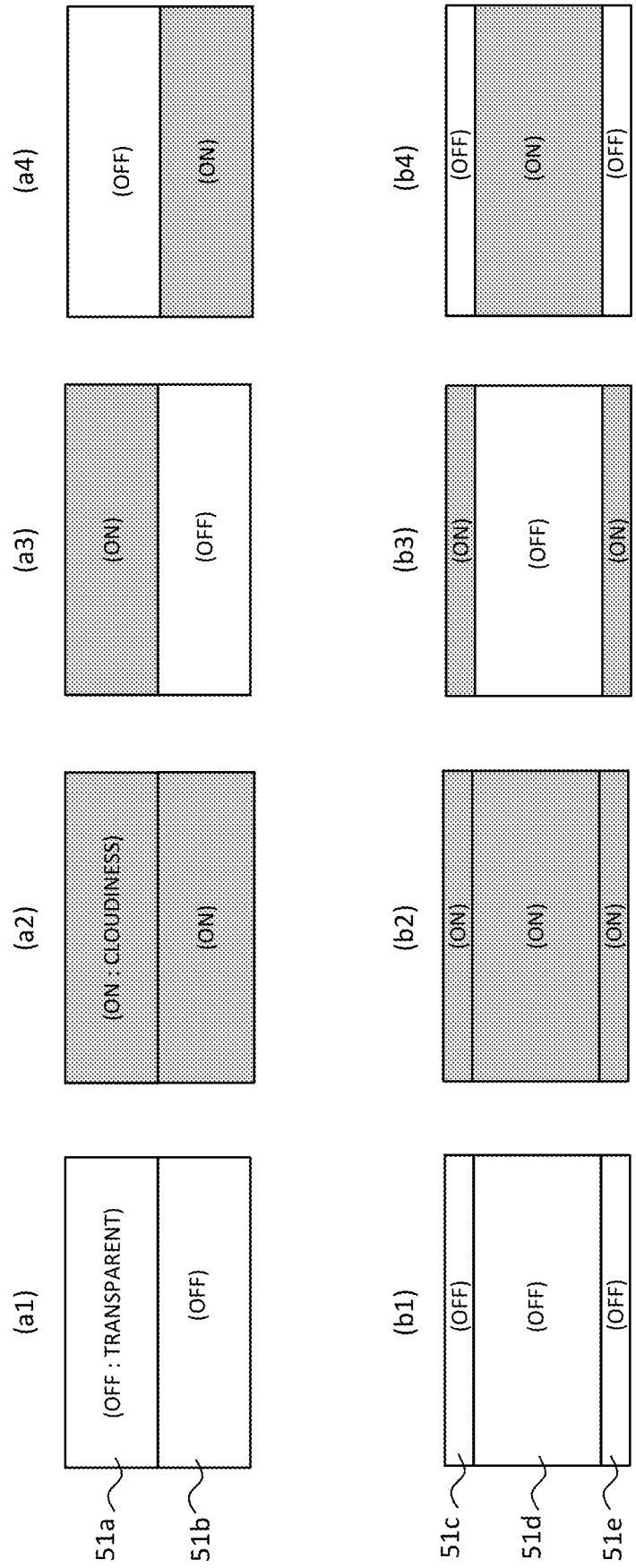
FIG. 10 is a diagram illustrating various partitioning patterns of a functional film.

FIG. 10 is a diagram illustrating various partitioning patterns of the functional film. (a1) to (a4) of FIG. 10 illustrate a case where the functional film is vertically bisected (51*a* and 51*b*), and a voltage ON/OFF control is performed for each region. As a result, switching can be made between a case where a long-distance virtual image is displayed on the entire surface (a1), a case where a short-distance virtual image is displayed on the entire surface (a2), and a case where the long-distance virtual image and the short-distance virtual image are vertically and simultaneously displayed (a3 and a4).

(b1) to (b4) of FIG. 10 illustrate a case where the functional film is vertically trisected (51*c* to 51*e*). In this case, for example, as illustrated in (b3) of FIG. 10, a long-distance virtual image can be displayed in a center region 51*d*, and a short-distance virtual image (speed or distance information) can be displayed in an upper or lower end 51*c* or 51*e*.

Although the transmittance of the functional film is realized by changing the particle state (light distribution property) in the film by applying a voltage, a predetermined period of time is necessary until transition between the transparent state and the cloudiness state is completed. If the display starts during the transition, display timings of the long-distance virtual image and the short-distance virtual image seen by the driver are deviated from each other, so that the images become obscure. In particular, when far and near virtual images are simultaneously displayed using the functional film partitioning pattern as illustrated in FIG. 10, it is desirable to adjust the emission timings of the far and near images in consideration of the transition time of the functional film.

Figure 11:
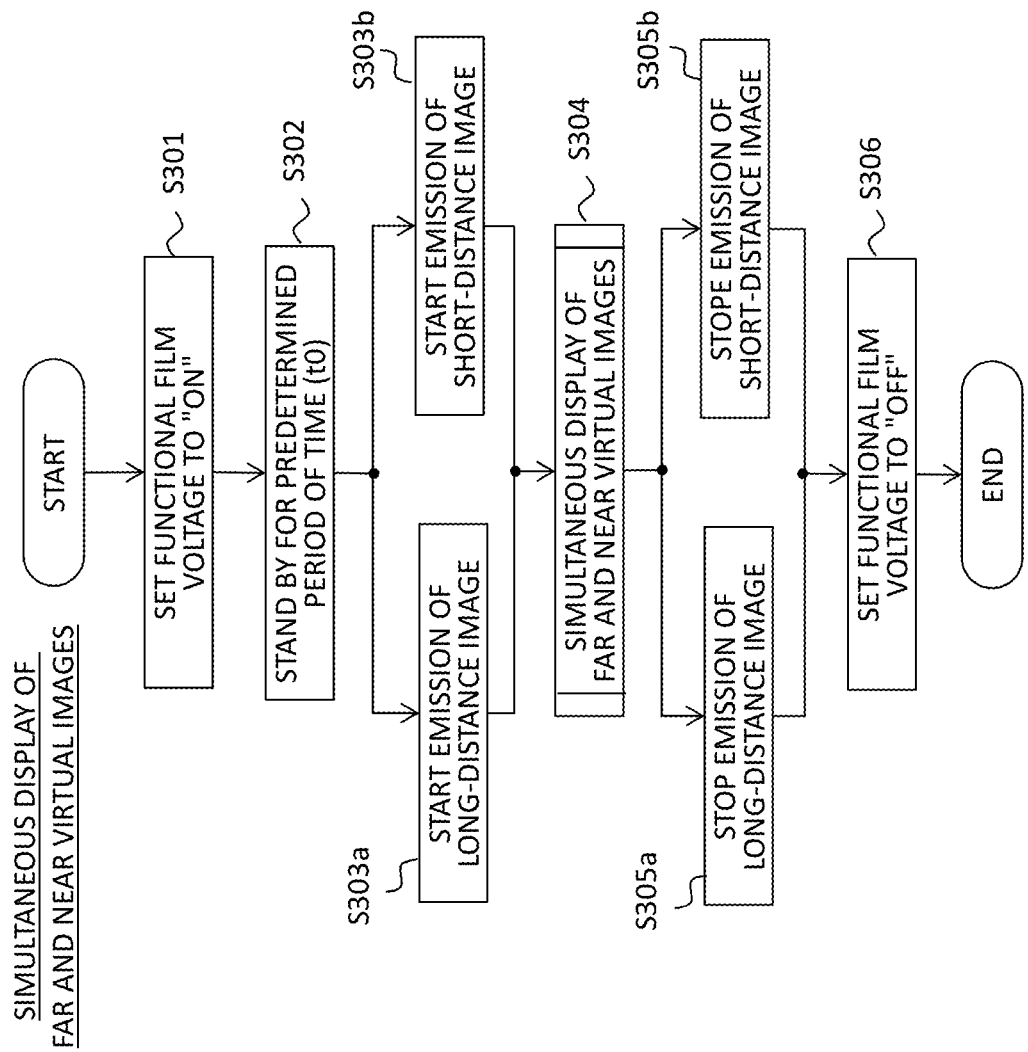
FIG. 11 is a flowchart for suitably performing simultaneous display of far and near virtual images.

FIG. 11 is a flowchart for suitably performing simultaneous display of far and near virtual images. A voltage of the short-distance display region of the functional film 51 is set to "ON" (S301), and the process waits for a predetermined period of time (t0) until the transition is completed, and the cloudiness state is established (S302). This period of time (t0) is determined by the transition time of the film material. Then, emission of the long-distance image and the short-distance image starts by turning on the light sources 31*a* and 31*b* of the first and second image display devices 30*a* and 30*b* (S303*a* and S303*b*), respectively, and the far and near virtual images are simultaneously displayed (S304).

In order to terminate the simultaneous display of the far and near virtual images, first, the light sources 31*a* and 31*b* of the first and second image display devices 30*a* and 30*b* are turned off, and emission of the long-distance image and the short-distance image stops (S305*a* and 305*b*). Then, the functional film is transitioned to the transparent state by setting the voltage of the functional film to "OFF" (S306). In this manner, by turning on/off the light sources 31*a* and 31*b* in consideration of the transition time of the functional film, it is possible to perform more easily viewable display while aligning the display timings between the far and near virtual images.

According to each configuration of the first embodiment, it is possible to provide a miniaturized HUD apparatus capable of using both the long-distance display and the short-distance display without necessity of a half mirror.

Second Embodiment

In the second embodiment, a case where a long-distance virtual image and a short-distance virtual image are alternately displayed will be described. If the display is switched between far and near virtual images at a high speed, the driver feels that the far and near virtual images are displayed simultaneously. In addition, the long-distance virtual image and the short-distance virtual image can also be overlappingly displayed by alternately displaying the long-distance virtual image and the short-distance virtual image in the same position of the display region.

FIG. 12 is a diagram illustrating a method of alternately displaying the far and near virtual images. The functional film 51 is attached to the entire surface of the glare trap part 50 of the HUD apparatus 1, and an ON/OFF control of the applied voltage is performed depending on the emitted long-distance and short-distance images. (a) of FIG. 12 illustrates a case where a long-distance image is emitted, in which a first image light beam 6*a* for a long distance is emitted from the first image display device 30*a* by setting the voltage of the functional film 51 to "OFF" (transparent). (b) of FIG. 12 illustrates a case where a short-distance image is emitted, in which a second image light beam 6*b* for a short distance is emitted from the second image display device 30*b* by setting the voltage of the functional film 51 to "ON" (cloudiness). The first image light beam 6*a* and the second image light beam 6*b* are alternately switched.

Figure 13:
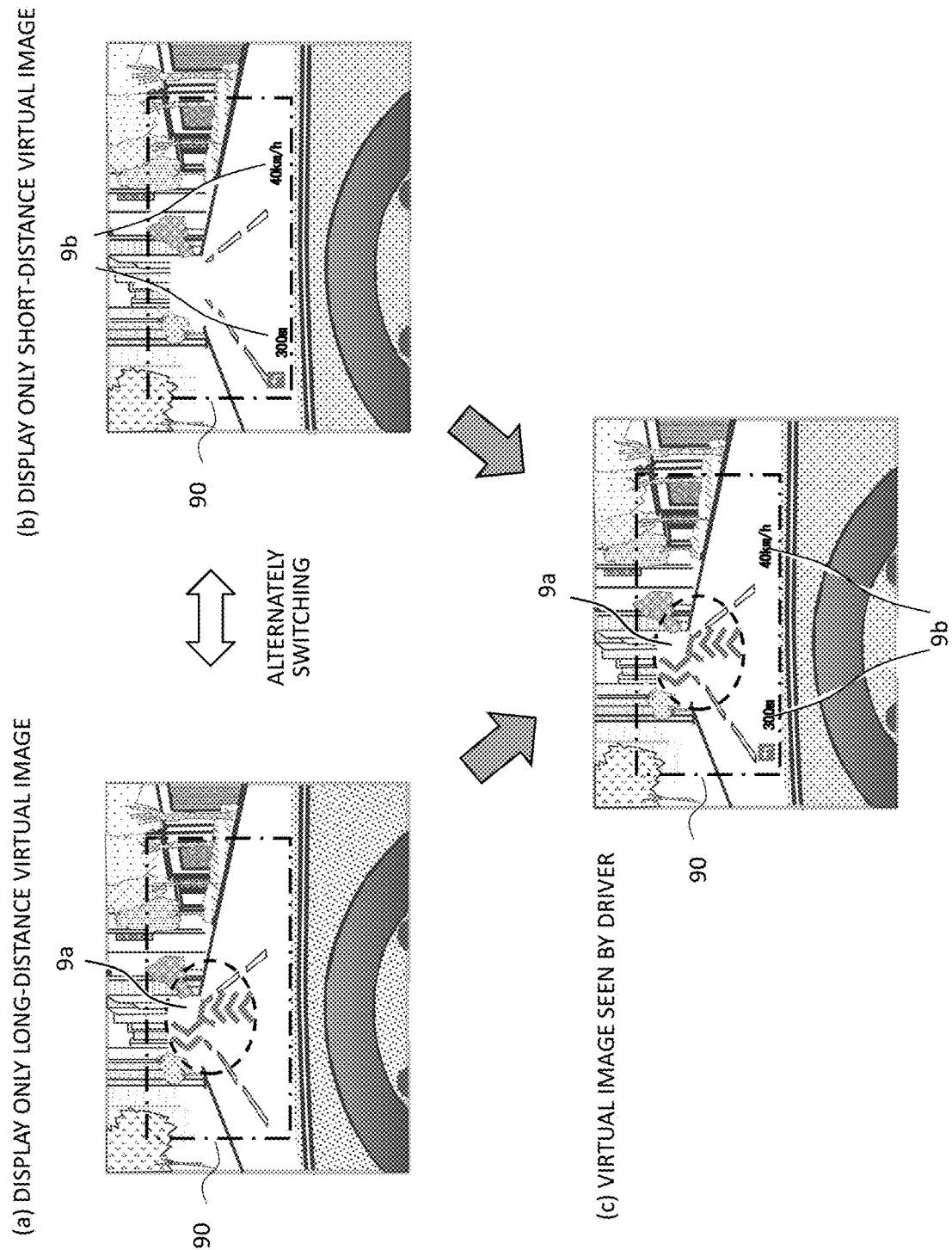
FIG. 13 is a diagram illustrating an example of the alternate display of far and near virtual images.

FIG. 13 is a diagram illustrating an example of alternate display between far and near virtual images. (a) of FIG. 13 illustrates a case where the long-distance virtual image 9*a* is displayed in the display region 90, and (b) of FIG. 13 illustrates a case where the short-distance virtual image 9*b* is displayed in the display region 90. If the long-distance virtual image 9*a* and the short-distance virtual image 9*b* are alternately switched, a driver feels that they are simultaneously displayed on the display region 90 as illustrated in (c) of FIG. 13. Although the long-distance virtual image 9a and the short-distance virtual image 9b are displayed in far positions in this example, they can also be displayed partially overlappingly.

FIG. 14 is a flowchart illustrating an alternate display operation between far and near virtual images. An operation of displaying the long-distance virtual image 9a for a period of time "ta" and an operation of displaying the short-distance virtual image 9b for a period of time "tb" are alternately repeated. The display periods of times "ta and tb" are set to match, for example, vertical synchronization timings of the display image.

First, the applied voltage of the functional film 51 is set to "OFF" (transparent) (S401), and the light source 31a of the first image display device 30a is turned on, so that emission of the long-distance image starts (S402). As the image is displayed for a predetermined period of time "ta" (S403), emission of the long-distance image stops (S404).

Then, the applied voltage of the functional film 51 is set to "ON" (cloudiness) (S405), and the light source 31b of the second image display device 30b is turned on, so that emission of the short-distance image starts (S406). As the image is displayed for a predetermined period of time "tb" (S407), emission of the short-distance image stops (S408). It is determined whether or not the display continues (S409). If the display continues, the process returns to S401, and the aforementioned operation is repeated.

According to the configuration of the second embodiment, there is a simultaneous display effect by alternately displaying the far and near virtual images. In addition, it is possible to overlappingly display the far and near virtual images.

Third Embodiment

In a third embodiment, a case where a film that forms an image by irradiating a special laser beam (hereinafter, referred to as a self-luminous film) is used as the functional film will be described. The self-luminous film is typically transparent, but a letter or image having a particular color (for example, green) is created by a luminous body of the irradiated portion when a laser beam having a particular wavelength is irradiated. When an image light beam except for the particular laser beam is irradiated, it directly transmits.

In the first and second embodiments, although a variable transmittance film is employed as a functional film, instead of this, the aforementioned self-luminous film is employed. Although the laser scanning type of FIG. 3B can be employed as the configuration of the HUD apparatus, the functional film control unit 52 is not necessary. In addition, attachment of the functional film 51 (self-luminous film) is similar to that of FIG. 5, but the functional film 51 may be partially attached to the glare trap part 50.

In the case of display of a long-distance virtual image, the first image light beam 6a is emitted from the first image display device 30a, and transmits through the self-luminous film, so that the first virtual image 9a is displayed. In the case of display of a short-distance virtual image, a second image is created on the self-luminous film by scanning the second image light beam 6b (laser beam) emitted from the second image display device 30b, and the second virtual image 9b is displayed by projecting the second image. In addition, the long-distance virtual image and the short-distance virtual image can also be simultaneously displayed.

According to the third embodiment, a display color of the short-distance virtual image 9b is fixed, but a voltage control for the functional film is not necessary, so that it is possible to simplify the device configuration. In addition, in the case of the self-luminous film, only a particular wavelength of a laser beam is efficiently used in the short-distance display. Therefore, even when the long-distance display is simultaneously performed, it is possible to maintain the light use efficiency.

Fourth Embodiment

In the fourth embodiment, various installation positions of the second image display device 30b will be described. If the laser scanning type illustrated in FIG. 3B is employed as the second image display device 30b for a short-distance display, it is possible to miniaturize the second image display device 30b. Therefore, there is a degree of freedom in the installation position.

Figure 15A:
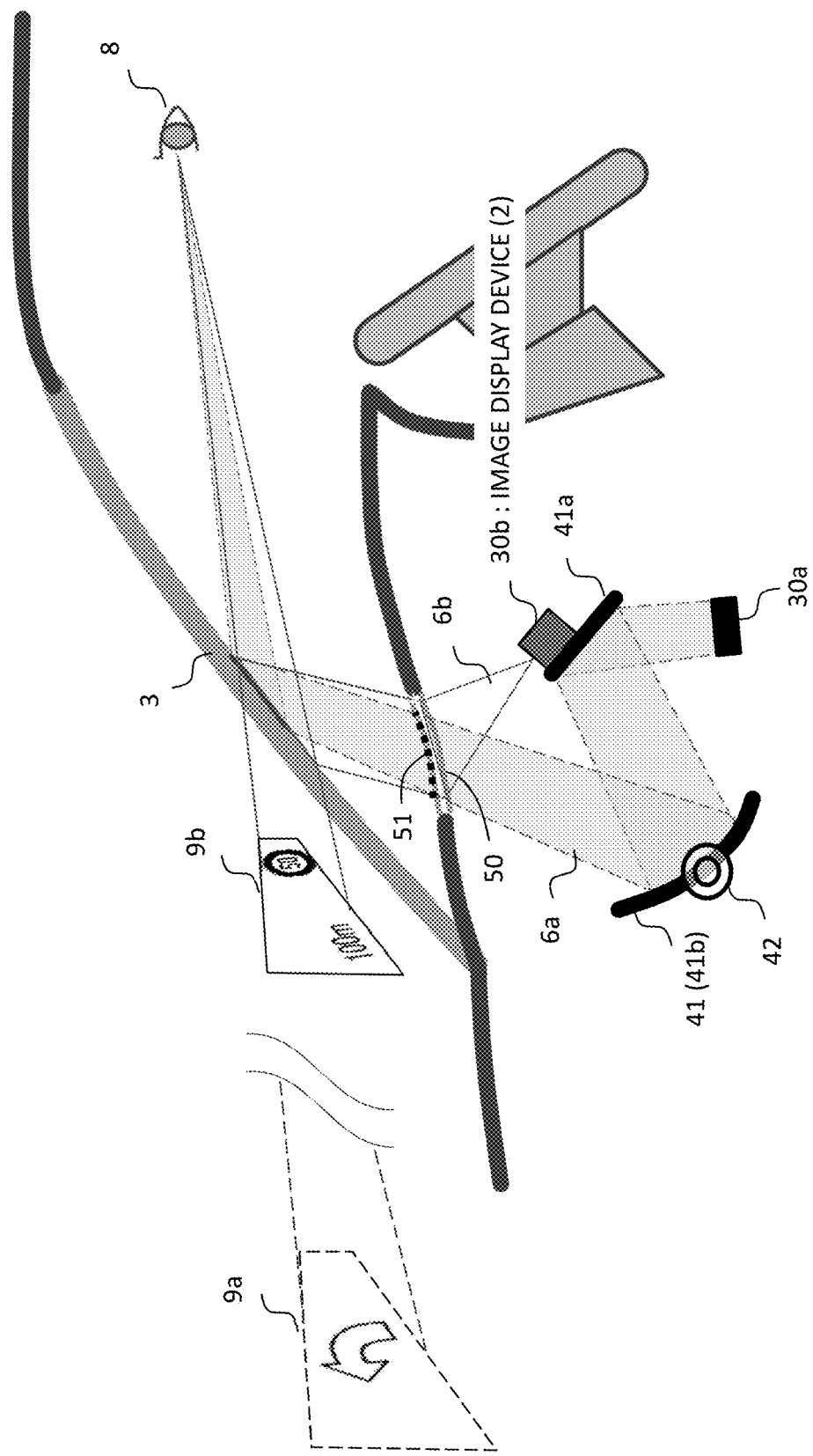
FIG. 15A is a diagram illustrating an example in which an installation position of a second image display device is changed.
Figure 15B:
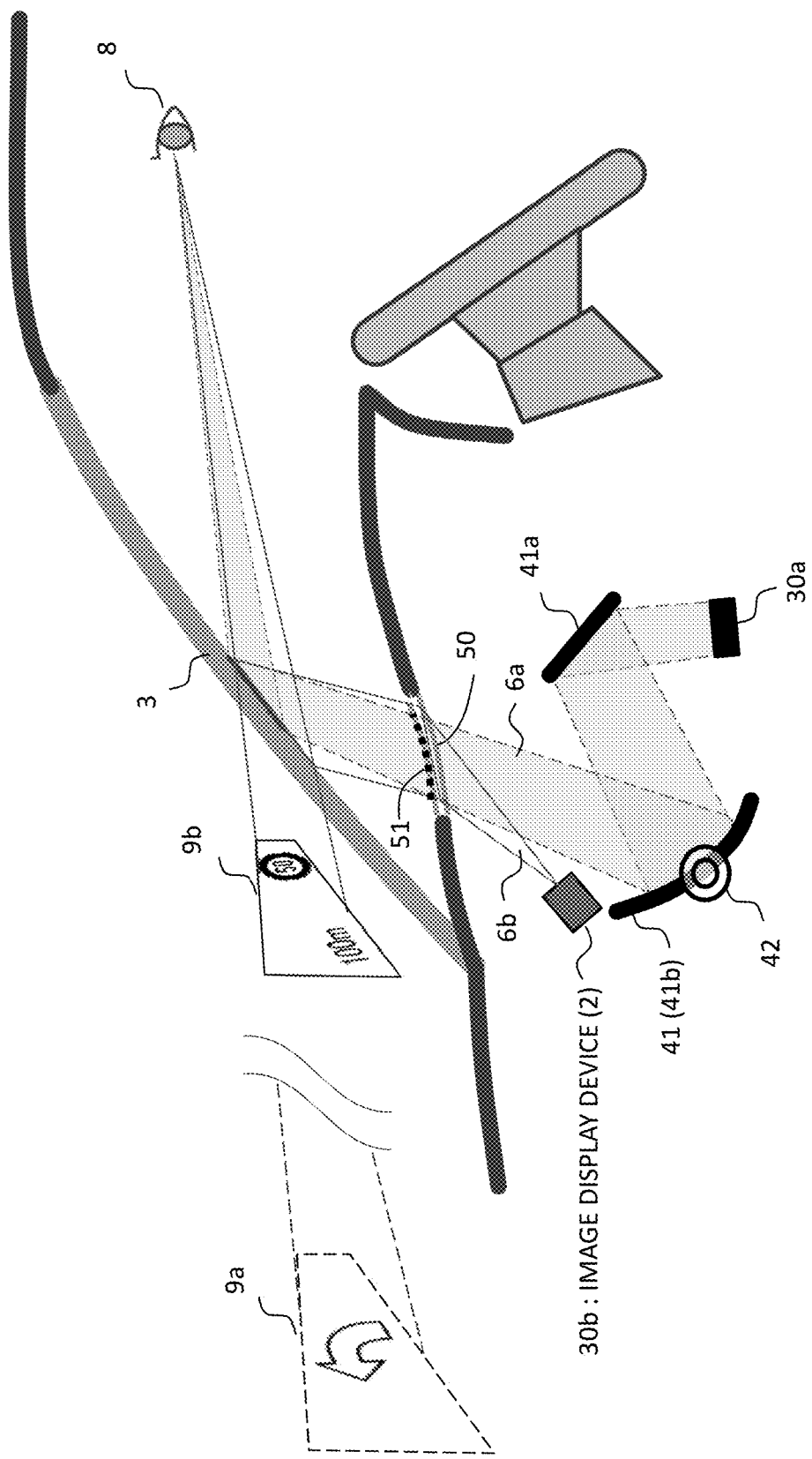
FIG. 15B is a diagram illustrating an example in which the installation position of the second image display device is changed.
Figure 15C:
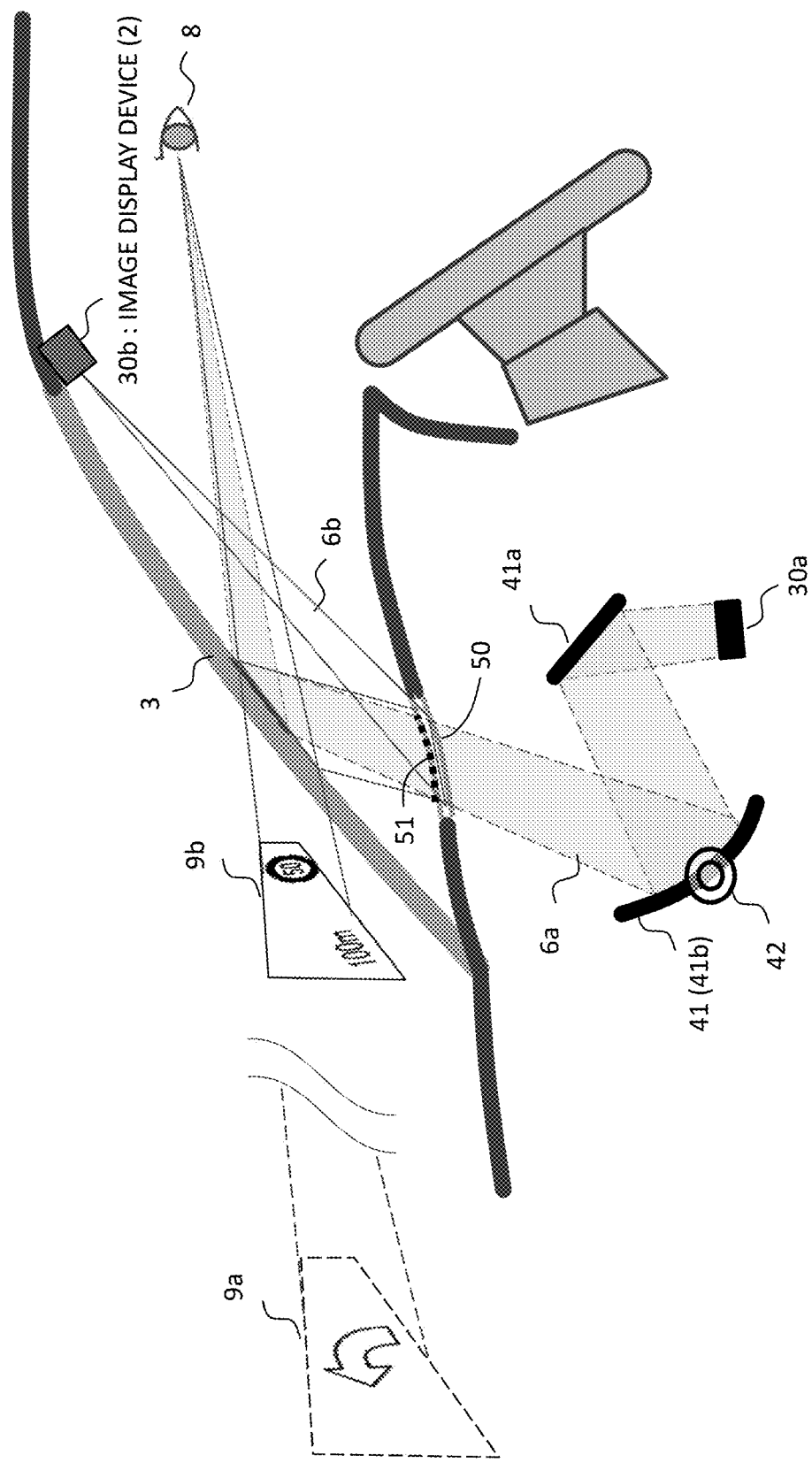
FIG. 15C is a diagram illustrating an example in which the installation position of the second image display device is changed.

FIGS. 15A to 15C are diagrams illustrating an example in which the installation position of the second image display device 30b is changed. FIG. 15A illustrates a case where the second image display device 30b is installed in the vicinity of the first mirror 41a, and FIG. 15B illustrates a case where the second image display device 30b is installed in the vicinity of the concave mirror 41 (41b). In both cases, if the second image light beam 6b is emitted to the functional film 51, the second image created on the functional film 51 is reflected on the windshield 3, so that a driver can visually recognize it as the second virtual image 9b. In addition, FIG. 15C illustrates a case where the second image display device 30b is installed in a ceiling of the vehicle, and the second image light beam 6b is emitted from the ceiling to the functional film 51 on the dashboard. This configuration is effective when a space for installing the second image display device 30b cannot be secured in the dashboard.

According to the fourth embodiment, the second image display device 30b can be installed in a vacant space of the first image display device 30a. As a result, it is possible to miniaturize the HUD apparatus that displays two channel images including far and near images.

The present invention is not limited to the aforementioned embodiments, but includes various modifications. For example, a part of the configuration of a certain embodiment can be substituted with a configuration of the other embodiment, and a configuration of the other embodiment can be added to a configuration of a certain embodiment. In addition, for a part of the configuration of each embodiment, any addition, deletion, or substitution of a configuration of the other embodiment can be possible.

REFERENCE SIGNS LIST

1 Head-up display (HUD) apparatus
2 Vehicle
3 Windshield
4 Vehicle information
6a, 6b Image light beam
8 Driver's eye
9a, 9b Virtual image
10 Vehicle information acquiring unit
20 Control unit
21 Electronic control unit (ECU)
25a, 25b Light source adjustment unit
25c Light source driving unit
26a, 26b Distortion correction unit
27a, 27b Display element driving unit 28 Mirror adjustment unit
28c Scan driving unit
30a First image display device
30b Second image display device
31a, 31b Light source
33a, 33b Display element
34 Laser light source
35 Scanning mirror
41 Concave mirror
42 Mirror driving unit
50 Glare trap part
51 Functional film
52 Functional film control unit
90 Display region

The invention claimed is:

1. A head-up display apparatus mounted on a vehicle to display a first virtual image and a second virtual image forward of a windshield, comprising:
   a functional film having a controllable transmittance attached to a glare trap part of the head-up display apparatus;
   a first image display device configured to project a first image to the windshield through the glare trap part to display the first virtual image; and
   a second image display device configured to create a second image on the functional film and project the second image to the windshield to display the second virtual image, wherein
   the transmittance of the functional film is controllable,
   displaying and non-displaying of the first virtual image and the second virtual image is switched by controlling the transmittance of the functional film, and
   the first virtual image and the second virtual image have different display distances.

2. The head-up display apparatus according to claim 1, wherein the second image display device creates the second image by projecting an image created in a display element to the functional film.

3. The head-up display apparatus according to claim 1, wherein the second image display device creates the second image by irradiating a laser beam to the functional film.

4. The head-up display apparatus according to claim 3, wherein the functional film is a transparent self-luminous film that emits light from an irradiated portion onto which a laser beam having a particular wavelength is irradiated, and the self-luminous film transmits the first image in a transparent state and creates the second image in an opaque state by irradiating the laser beam having the particular wavelength.

5. The head-up display apparatus according to claim 1, wherein the functional film is a variable transmittance film having a light transmittance that changes according to an applied voltage, and
   the variable transmittance film transmits the first image in a transparent state and creates the second image in an opaque state.

6. The head-up display apparatus according to claim 5, wherein the variable transmittance film is segmented into regions and is attached to the glare trap part,
   the applied voltage changes for each segmented region of the variable transmittance film,
   the variable transmittance film displays the first virtual image from a first region having the transparent state, and
   the variable transmittance film simultaneously displays the second virtual image from a second region having the opaque state.

7. The head-up display apparatus according to claim 5, wherein the first and second virtual images are alternately displayed by alternately switching the first and second images to be projected and switching the voltage applied to the variable transmittance film depending on the switching of the first and second images.

8. The head-up display apparatus according to claim 1, wherein the functional film is attached to a part of the glare trap part,
   the second virtual image is displayed from a region where the functional film is attached,
   the first virtual image is simultaneously displayed from a region where the functional film is not attached.

9. The head-up display apparatus according to claim 1, wherein the functional film is a variable transmittance film having a light transmittance that changes according to an applied voltage, and
   wherein a controller is configured to selectively control a voltage applied to the variable transmittance film to change the variable transmittance film between transparent and opaque states.

* * * * *